United States Patent [19]

Gentile et al.

[11] 4,248,564

[45] Feb. 3, 1981

[54] METHOD AND APPARATUS FOR OPENING A FILM CARTRIDGE

[75] Inventors: Ralph Gentile; John S. Lercher, both of Rochester, N.Y.

[73] Assignee: Eastman Kodak Company, Rochester, N.Y.

[21] Appl. No.: 9,010

[22] Filed: Feb. 5, 1979

[51] Int. Cl.³ ........................ B65G 65/04; B65D 49/12

[52] U.S. Cl. .................................... 414/412; 29/426.5; 225/93; 225/103; 414/786

[58] Field of Search ....................... 414/411, 412, 786; 29/427; 225/93, 103, 104

[56] References Cited

U.S. PATENT DOCUMENTS 4,171,055 10/1979 Lindgren ............................ 414/412

*Primary Examiner*—Robert G. Sheridan

*Attorney, Agent, or Firm*—Roger A. Fields

[57] ABSTRACT

An opening method and apparatus for opening a frangible cartridge containing a disk of exposed film, makes use of a punch and die assembly for punching the film disk out of the cartridge. Opposed wall members of the cartridge, between which the film disk is located, are punched away from the remainder of the cartridge along with the film disk. In this way, the wall members shield the film disk from any fragments which may be produced during cartridge opening.

11 Claims, 16 Drawing Figures

METHOD AND APPARATUS FOR OPENING A FILM CARTRIDGE

CROSS-REFERENCE TO A RELATED APPLICATION

Reference is made to commonly assigned, copending U.S. Pat. Application Ser. No. 931,053, entitled PHOTOGRAPHIC FILM CARTRIDGE ASSEMBLY AND CAMERA, filed in the name of Gurdip S. Sethi on Aug. 4, 1978, now U.S. Pat. No. 4,194,822.

BACKGROUND OF THE INVENTION

1. Field of the Invention

The present invention relates generally to a method and an apparatus for opening film cartridges and for removing the exposed film from an opened cartridge. More particularly, the invention makes use of a punch and die assembly for opening a frangible cartridge and for permitting the exposed film to be easily removed without scratching or otherwise damaging the film emulsion.

2. Description of the Prior Art

Many of the film cartridges in use today are constructed of a frangible material which usually is plastic. After the contained film is exposed, the cartridge must be opened to remove and process the film. One known type of cartridge opener generally includes a hole saw or a spinning cutter which cuts through the plastic case of the film cartridge to provide an opening of sufficient size to remove the exposed film. However, these opening devices usually produce bits of plastic during the cutting operation which may fall onto the exposed film and could scratch or otherwise damage the film emulsion. Furthermore, these opening devices often cut a section from the cartridge which may fall into the cartridge, making it difficult to remove the exposed film.

Another known type of cartridge opener generally includes force-applying means for breaking open the cartridge to remove the exposed film. Here again, bits of plastic are produced which may contact the exposed film and damage the emulsion during the processing operation.

SUMMARY OF THE INVENTION

The above described problems associated with known cartridge opening devices are believed solved by the present invention. Specifically, according to the present invention a method and an apparatus are provided for quickly opening a cartridge without danger of scratching or otherwise damaging the exposed film. With the present invention, any bits of plastic which may be produced during cartridge opening are shielded from the film emulsion.

In keeping with the teachings of the present invention, there is provided a method and an apparatus for removing exposed film, generally in the shape of a disc, from a cartridge. The cartridge may be of the type described in the above referenced Sethi patent application, entitled PHOTOGRAPHIC FILM CARTRIDGE ASSEMBLY AND CAMERA, and includes a film disc located between a pair of wall members of the cartridge. The wall members have respective peripheral edge portions secured together and respective central portions overlying opposite sides of the film disc. According to the invention, the method and apparatus call for punching the wall members of the cartridge to sever the peripheral edge portions from the central portions, though maintaining the central portions overlying opposite sides of the film disc. Since the film disc is therefore sandwiched between the central portions of the wall members during the punching or cutting operation, the film emulsion is shielded by the central portions from any bits of plastic which may be produced. Following this operation, the central portions may be readily separated to remove the film disk for processing.

BRIEF DESCRIPTION OF THE DRAWINGS

For a more complete understanding of the present invention, as well as further advantages and features thereof, reference should be had to the following detailed description of the invention taken in conjunction with the accompanying drawings, in which.

DESCRIPTION OF THE PREFERRED EMBODIMENT

Before proceeding with a description of the preferred embodiment of the present invention, it is well to first consider a film cartridge with which the preferred embodiment may be used. Since the film cartridge generally is of the type described in the above referenced Sethi patent application, which is incorporated in this patent application by reference, there is described below only those features of the film cartridge which are necessary for a complete understanding of the purpose and operation of the present invention.

FILM CARTRIDGE

Figure 1:
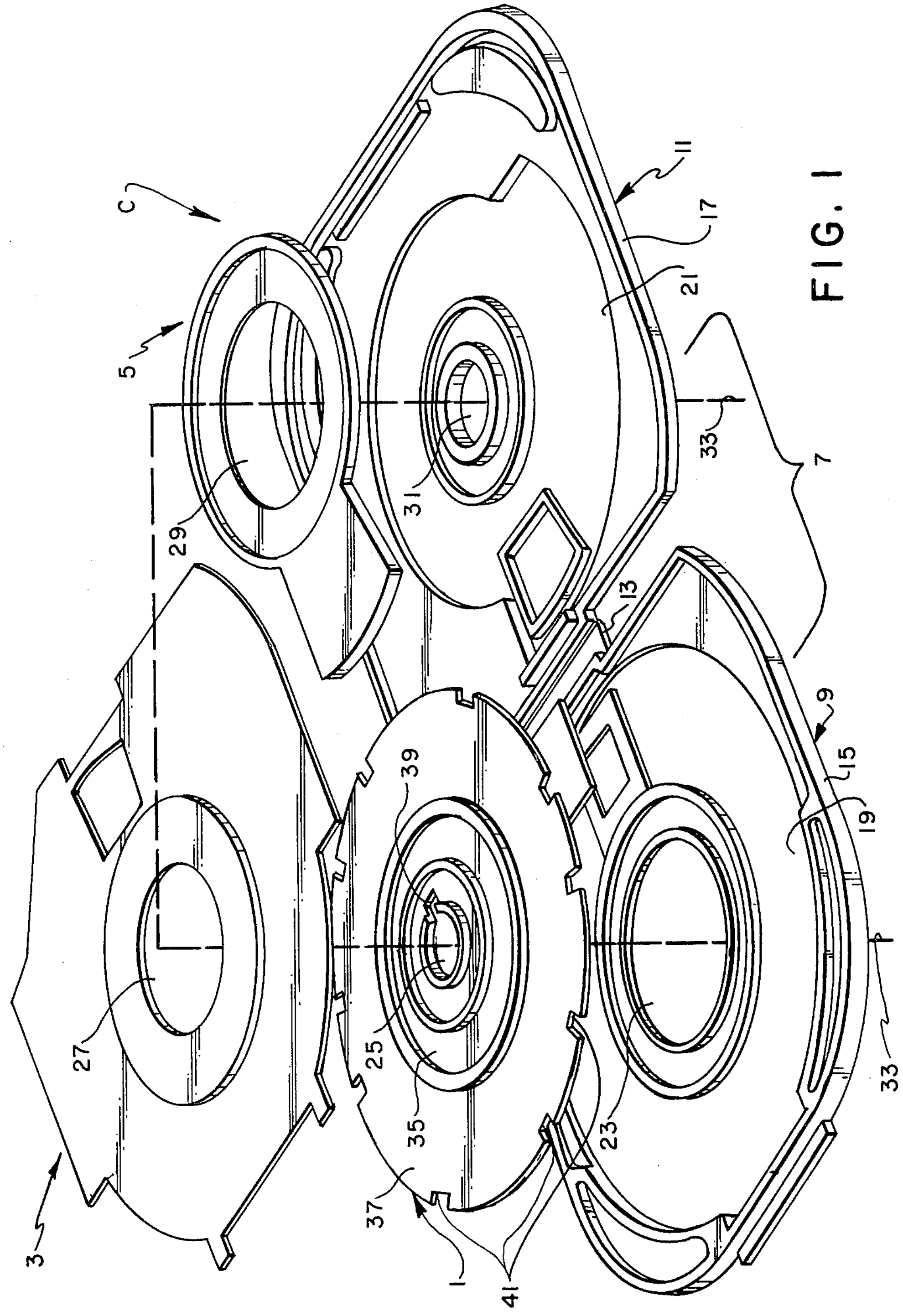
FIG. 1 is an exploded perspective view of the Sethi film cartridge with which a preferred embodiment of the present invention may be used.

The film cartridge C, as shown in exploded perspective view in FIG. 1, consists of a film disk 1, a separator layer 3, a cover member or dark slide 5 and a casing 7 which, although shown opened, is normally closed. The casing 7 has respective halves or wall members 9 and 11 which are connected by an integrally formed hinge 13. The casing halves 9 and 11 respectively include mating peripheral edge portions 15 and 17, secured together, and remaining or central portions 19 and 21 between which the film disk 1, the separator layer 3 and the cover member 5 are sandwiched. As depicted in FIG. 1, the casing half 9, the film disk 1, the separator layer 3, the cover member 5 and the casing half 11 respectively have central apertures 23, 25, 27, 29 and 31 which are each concentrically disposed about a common axis 33. The film disk 1 and the cover member 5 are supported within the casing 7 for rotation about the common axis 33, whereas the separator layer 3 is fixed in place.

The film disk 1 includes a rigid core or hub 35, encircling the central aperture 25, and an annular film unit 37 which is disposed about and bonded to the core. The core 35 has a keyway 39 which opens into the central aperture 25. A plurality of radially oriented circumferential perforations 41 are provided in the film unit 37, which cooperate with appropriate camera structure, not shown, for film metering and location purposes.

Other details of the film cartridge, although shown in FIG. 1, are not necessary for an understanding of the present invention and, therefore, are not described in this application. However, a complete description of these cartridge details may be found in the Sethi application, incorporated by reference.

CARTRIDGE OPENER

Figure 2:
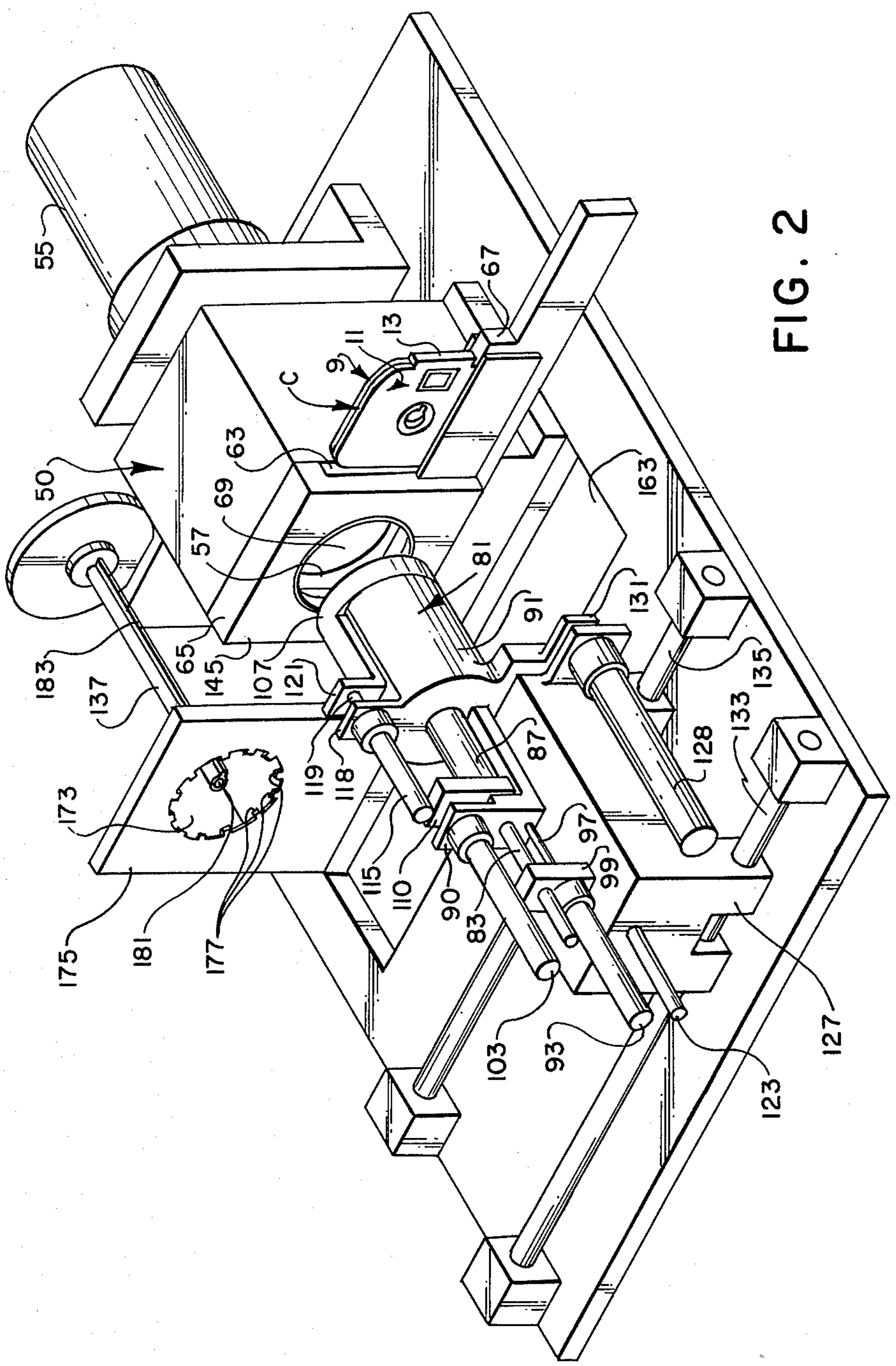
FIG. 2 is a perspective view of a punch and die assembly in accordance with the preferred embodiment of the invention.
Figure 3:
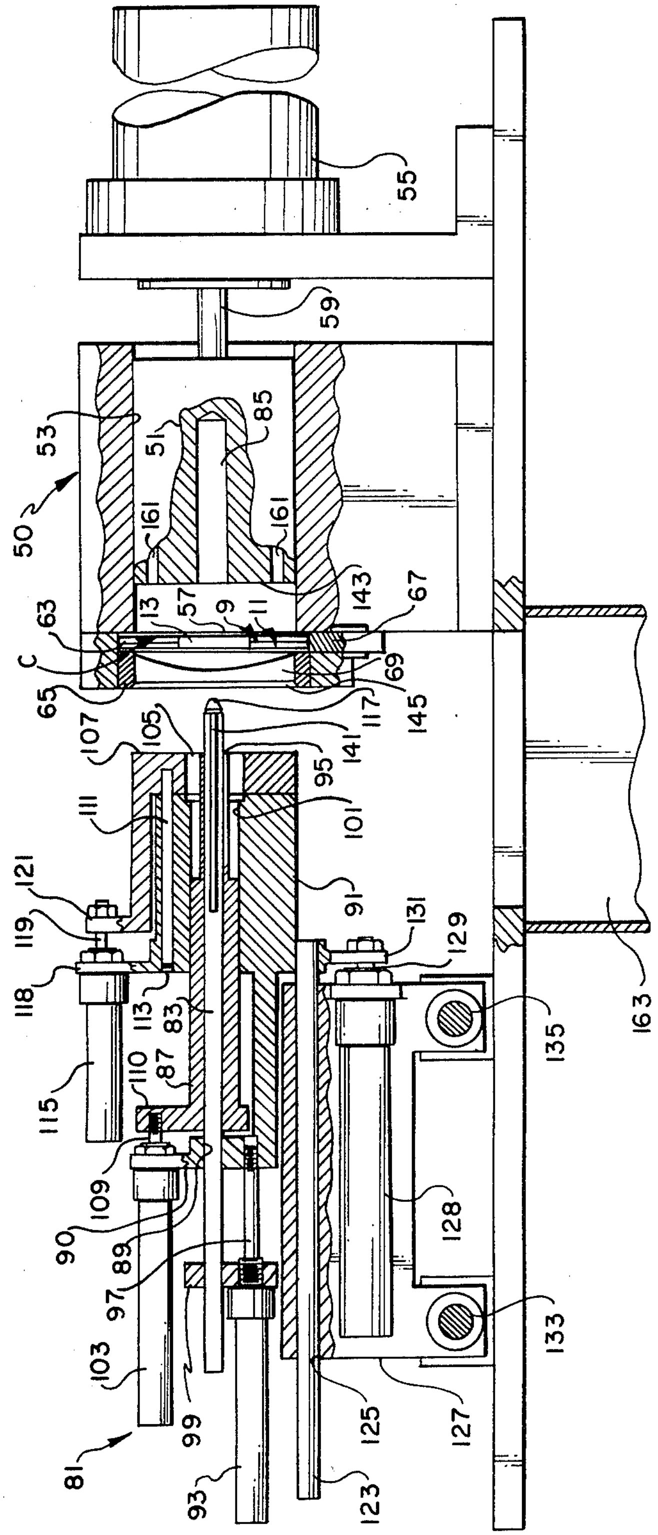
FIG. 3, 5, 6, 7, 10, 11, 12, 13, 15 and 16 are elevation views, partially in section, of the punch and die assembly and illustrate its sequence of operation for opening the film cartridge depicted in FIG. 1 and for removing a film disk from the opened cartridge.
Figure 4:
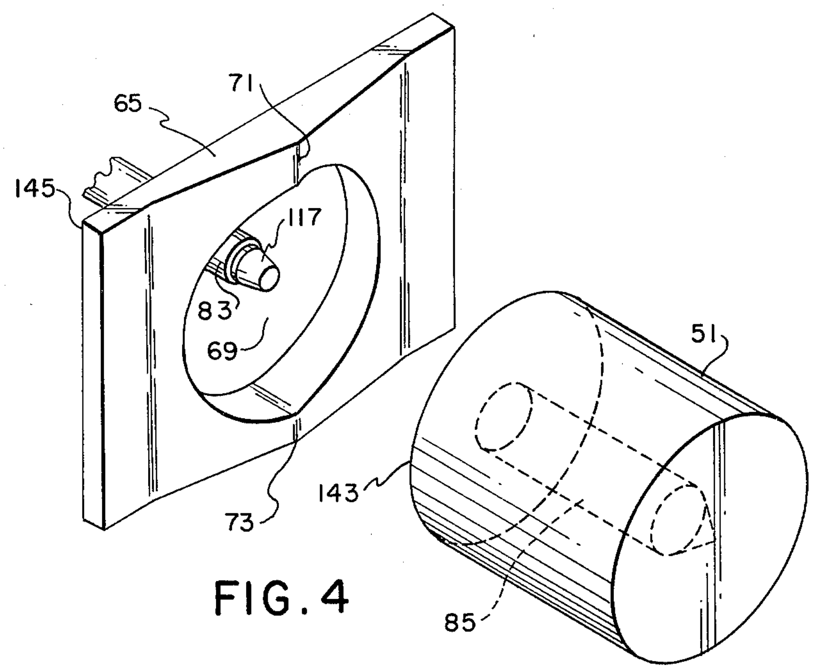
FIG. 4 is a perspective view of a die plate and a punch in the punch and die assembly.

Referring now to FIGS. 2 and 3, there is shown a punch and die assembly for opening the film cartridge C, just described, and for removing the film disk 1 from the opened cartridge. In the assembly, a punch mechanism 50 has a cylindrically shaped punch 51 which is mounted for sliding movement in a complementarily shaped sleeve 53. The punch 51 is separately actuatable by a pneumatic air cylinder 55 first to move forward, i.e., to the left in FIG. 3, outward from an open end 57 of the sleeve 53, and then to move rearward back into the open end. The air cylinder 55 has a movable drive rod 59 which is connected to the punch 51. A nest 63, into which the film cartridge C is loaded for opening, is located between the punch 51 and a die plate 65. The cartridge is loaded into the nest 63 by first placing the cartridge in a slidably mounted tray 67 and then moving the tray into the nest. The die plate 65, as shown in FIG. 4, has a central opening 69 into which the punch 51 is moved forward by the air cylinder 55. Two cutting edges 71 and 73 on the die plate 65 serve to initiate fracture of the film cartridge upon being struck by the punch 51.

Figure 7:
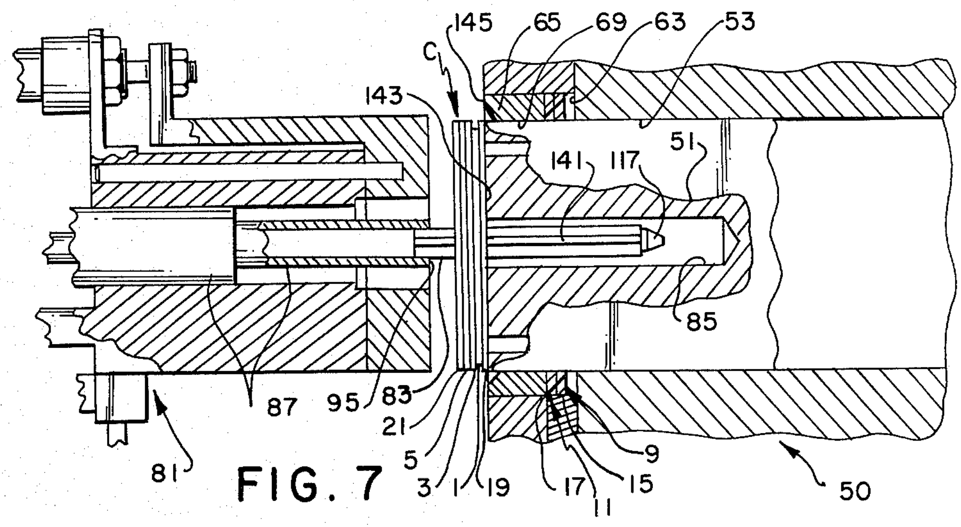

Referring again to FIGS. 2 and 3, a receiver mechanism 81 is provided for holding the film cartridge C within the nest 63, in the path of the forwardly moved punch 51, after the tray 67 is removed from the nest 63. The receiver mechanism has a support bar 83 which is receivable in the central apertures 23, 25, 27, 29 and 31 in the various members of the film cartridge in FIG. 1. Viewing FIG. 3, the support bar 83 is aligned with the center of the die opening 69 and with a central bore 85 in the punch 51. The central bore 85 is appropriately sized to admit the support bar 83 as the punch 51 is moved forward by the air cylinder 55, as shown in FIG. 7. The support bar 83, in FIG. 3, is mounted for sliding movement within a stripper tube 87 and through a central bore 89 in a plate-like extension 90 of a barrel-like housing 91. The support bar 83 is separately actuatable by a pneumatic air cylinder 93 first to move forward, i.e., to the right in FIG. 3, outward from an open end 95 of the stripper tube 87, and then to move rearward back into the open end. The air cylinder 93 has a stationary drive rod 97 which is connected to the housing extension 90. A collar plate 99 fixedly couples the support bar 83 and the air cylinder 93, which causes forward or rearward movement of the air cylinder 93 along the stationary rod 97 to similarly move the support bar 83.

The stripper tube 87 is mounted for sliding movement along the support bar 83 and within a central bore 101 in the barrel-like housing 91. The stripper tube 87 is separately actuatable by a pneumatic air cylinder 103 first to move forward, i.e., to the right in FIG. 3, outward from a central opening 105 in a disk-like face plate 107, and then to move rearward back into the central opening. The air cylinder 103 is fixed to the housing extension 90 and has a movable drive rod 109 which is connected to a plate-like extension 110 of the stripper tube 87. The disk-like face plate 107 is fixed to a stabilizer rod 111, mounted for sliding movement within an off-center bore 113 in the housing 91. The face plate 107 is separately actuatable by a pneumatic air cylinder 115 first to move forward, i.e., to the right in FIG. 3, beyond a leading tip 117 of the support bar 83, and then to move rearward back along the support bar. The air cylinder 115 is secured to a plate-like extension 118 of the housing 91 and has a movable drive rod 119, connected to a plate-like extension 121 of the face plate 107.

Figure 5:
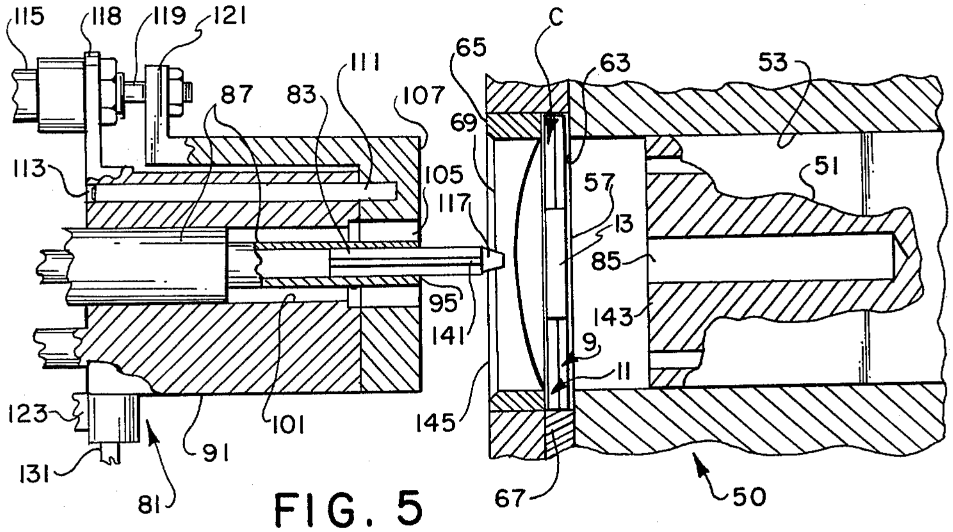

The housing 91 is fixed to a stabilizer rod 123, mounted for sliding movement within a bore 125, in a carriage stand 127. The receiver mechanism 81, which generally comprises a housing 91, the support bar 83, the stripper tube 87, the face plate 107 and the air cylinders 93, 103 and 115 is supported by the stabilizer rod 123 for movement forward from an original or starting position, shown in FIG. 3, to an extended position, shown in FIG. 5, and for movement rearward back to the starting position. In the starting position, the receiver mechanism 81 is located remote from the punch mechanism 50, whereas in the extended position, the receiver mechanism is located close to the punch mechanism. The receiver mechanism 81 is separately actuatable for the forward and rearward movements, respectively to the extended and starting positions, by a pneumatic air cylinder 128 which is fixed to a side of the carriage stand 127 and has a movable drive rod 129, connected to a depending extension 131 of the housing 91. The carriage stand 127 rides on a pair of rails 133 and 135 to enable lateral movement of the receiver mechanism 81 by manual or other means from the starting position, shown in FIG. 2, to a transfer position, in which the support bar 83 is aligned with a photofinishing spindle 137 for transferring the film disk 1 from the support bar to the photofinishing spindle.

OPERATION

A. Beginning with FIGS. 2 and 3, a film cartridge C is placed in the tray 67, and the tray with the cartridge is moved into the nest 63 between the punch 51 and the die plate 65.

B. Then, the receiver mechanism 81 is moved forward by the air cylinder 129 from the starting position, in FIG. 3, to the extended position, in FIG. 5. The receiver mechanism 81 is located closer to the punch mechanism 50 in the extended position than in the starting position.

Figure 6:
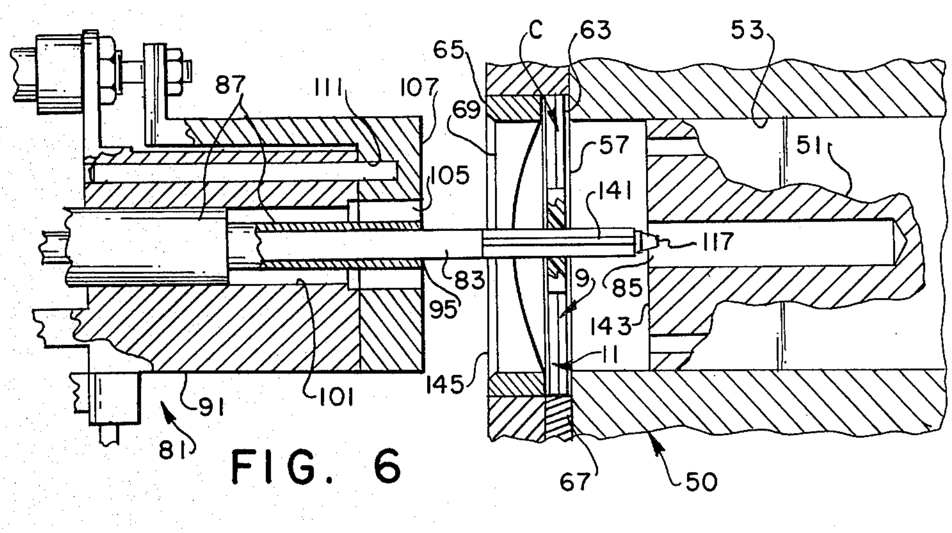

C. In FIG. 6, the support bar 83 is moved forward by the air cylinder 93 from the open end 95 of the stripper tube 87, through the central opening 69 in the die plate 65, and slightly into the central bore 85 in the punch 51. During such forward movement, the support bar 83 is inserted in succession through the central apertures 31, 29, 27, 25 and 23 respectively in the casing half 11, the cover member 5, the separator layer 3, the film disk 1 and the casing half 9, of the film cartridge C in FIG. 1. As the support bar 83 moves through the central aperture 25 in the film disk 1, a key 141 on the support bar is received in the keyway 39 of the disk core 35 to assure correct positioning of the film disk with respect to the die opening 69 and the punch 51.

Figure 8:
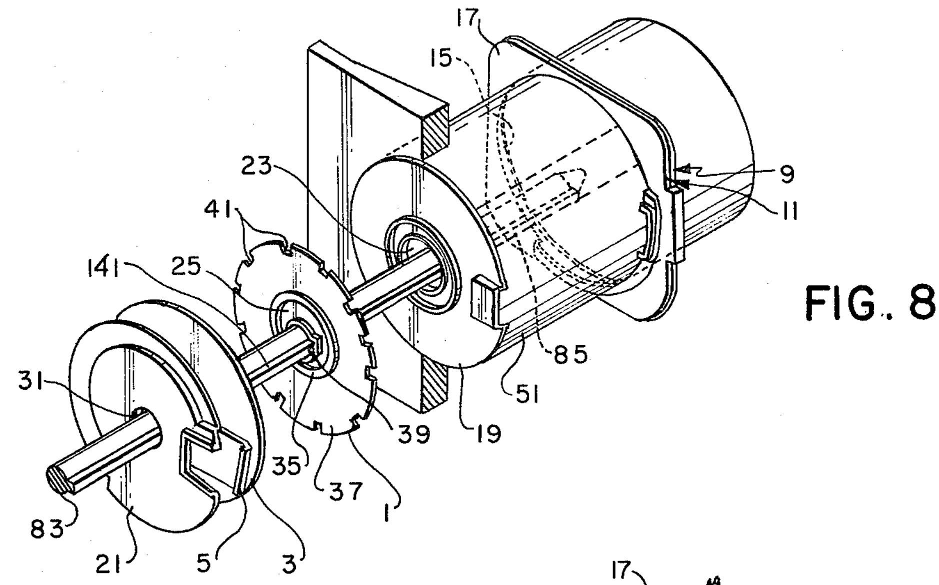
FIG. 8 is an exploded perspective view of the film cartridge depicted in FIG. 1, after the operational steps for punching have been completed.

D. In FIG. 7, the tray 67 is removed from the nest 63, leaving the film cartridge C in the nest. Then, the punch 51 is moved forward by the air cylinder 55 through the die opening 69. The punch 51 comes to rest with its face 143 substantially flush with a face 145 of the die plate 65 and with the support bar 83 substantially received in the central bore 85 in the punch. When the punch 51 first strikes the film cartridge C in the nest 63, it drives disk-like configurations of the central portions 19 and 21 of the casing halves or wall members 9 and 11, as well as the film disk 1, a disk-like configuration of the separator layer 3 and the cover member 5, along the support bar 83 and completely through the die opening 69, as in FIGS. 7 and 8. This effectively severs the central portions 19 and 21 of the casing halves 9 and 11 from the peripheral portions 15 and 17 of the casing halves, leaving respective annular configurations or rings of the peripheral portions disposed about the punch 51, in the nest 63. During the punching, the film disk 1 is sandwiched between the central portions 19 and 21, which are formed by the punching with respective diameters slightly larger than the diameter of the film disk. This sandwiching serves to shield the film disk from any bits of plastic which may result from the punching.

Figure 9:
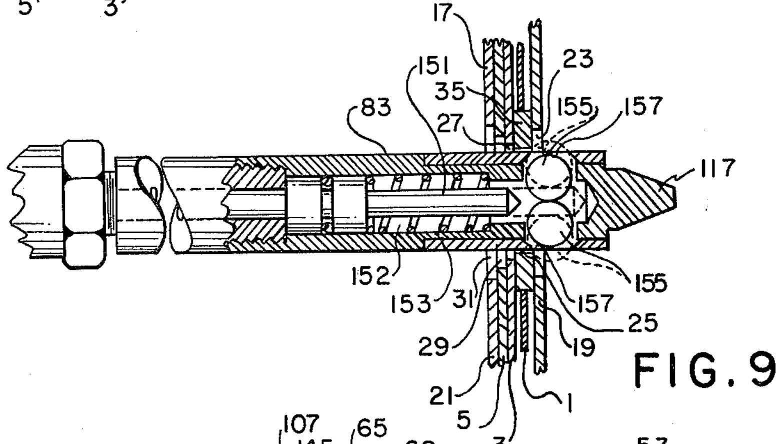
FIG. 9 is an elevation view, partially in section, of a support bar in the punch and die assembly.

E. In FIG. 9, a piston 151, disposed within a central chamber 152 in the support bar 83, is driven to the right by compressed air from an auxiliary source, not shown, against the reverse urging of a return spring 153. The drive piston 151 moves two ball detents 155 in the chamber 152 partially through respective openings 157, causing the ball detents to protrude slightly from the support bar 83. The two ball detents 155 are normally held within the chamber 152, inside of the respective openings 157, by a pair of return magnets, not shown.

Figure 10:
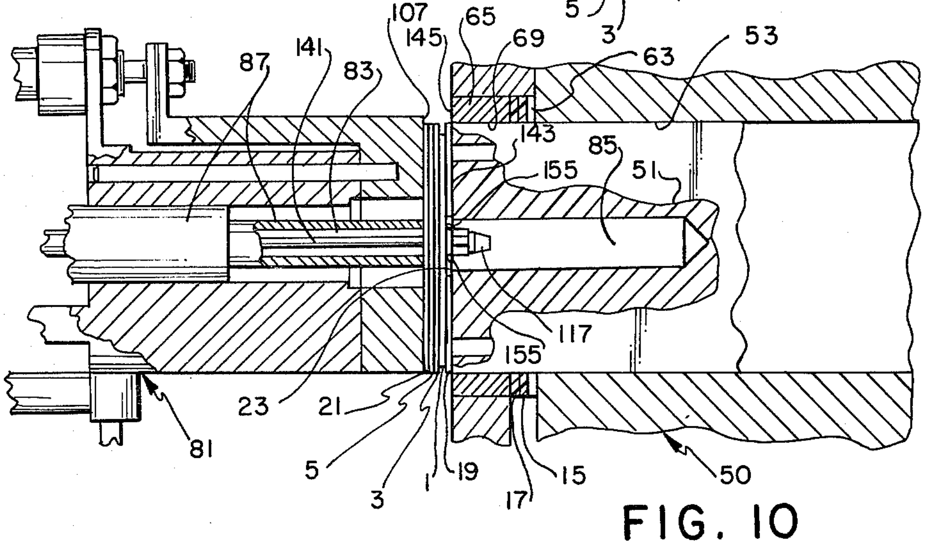

F. In FIG. 10, the support bar 83 is moved rearward partially into the stripper tube 87 by the air cylinder 93. This causes the protruding ball detents 155 on the support bar 83 to move into the aperture 23 in the central portion 19 of the film cartridge and to engage the rigid core 35 of the film disk 1, as in FIG. 9. The protruding ball detents 155 then hold the film disk 1, the separator layer 3, the cover member 5 and the central portion 21 against the face plate 107 of the receiver mechanism 81.

Figure 11:
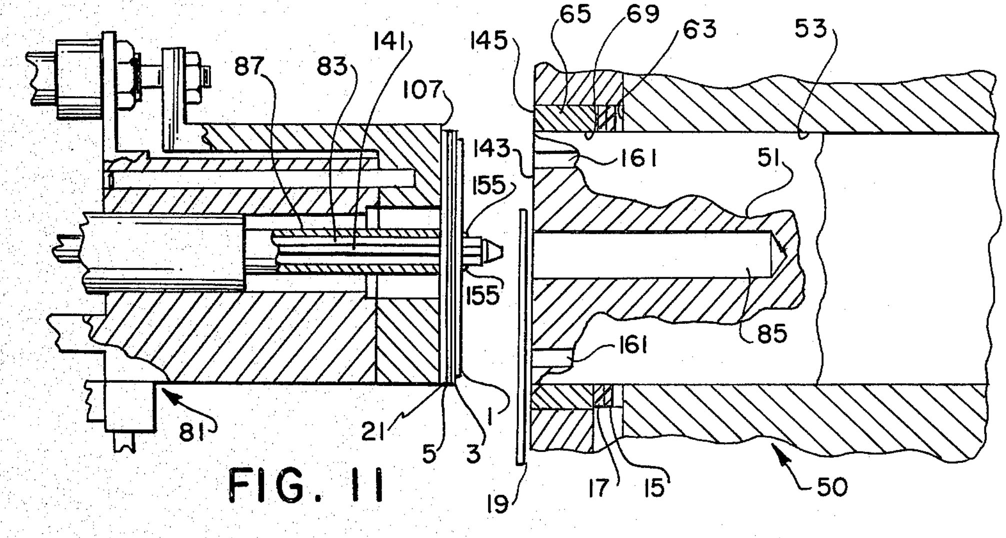

G. In FIG. 11, the receiver mechanism 81 is moved rearward by the air cylinder 129 from the extended position, close to the punch 51, to the starting position, remote from the punch. The central portion 19, which is initially held to the face 143 of the punch 51 by a vacuum force in two ducts 161 in the punch 51, is dispatched from the punch face by a positive blast of air supplied to the punch ducts by an auxiliary source, not shown. The dispatched central portion 19 then falls into a scrap bin 163 in FIGS. 2 and 3.

Figure 12:
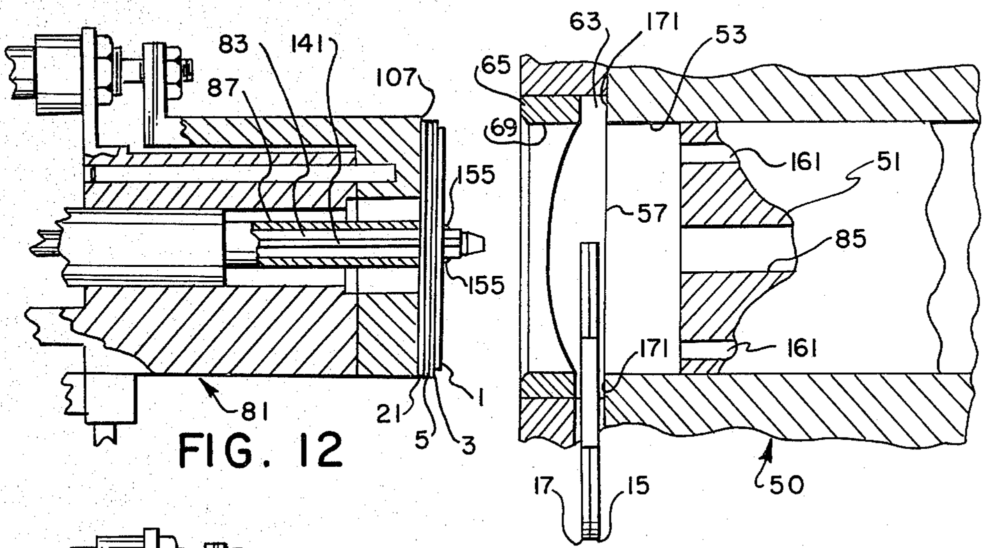

H. In FIG. 12, the punch 51 is moved rearward into the open end 57 of the sleeve 53 by the air cylinder 55. The peripheral portions 15 and 17 of the film cartridge C, which are disposed about the punch in the nest 63, are edged off the punch by a shoulder 171 of the sleeve 53 as the punch moves rearward. This causes the peripheral portions 15 and 17 of the film cartridge to fall into the scrap bin 163 in FIGS. 2 and 3.

I. Then, the receiver mechanism 81 is moved laterally by manual or other means from the starting position, shown in FIG. 2, to the transfer position, in which the support bar 83 is aligned with the photofinishing spindle 137 for transferring the film disk 1 from the support bar to the photo-finishing spindle.

Figure 13:
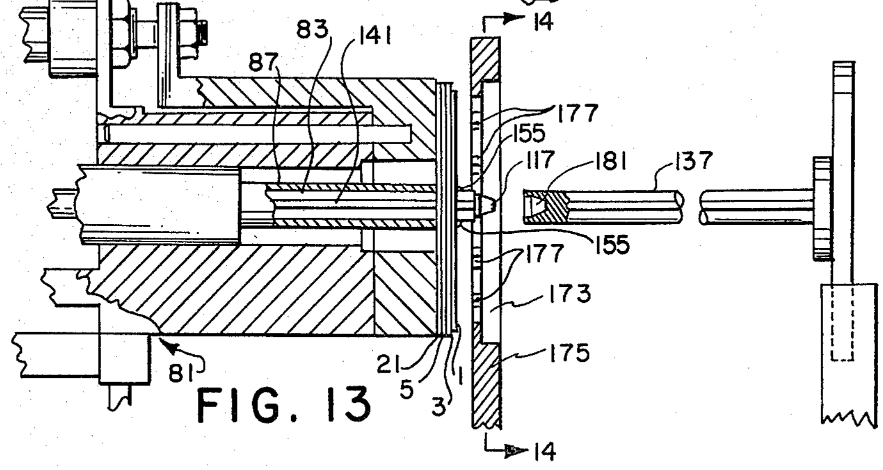
Figure 14:
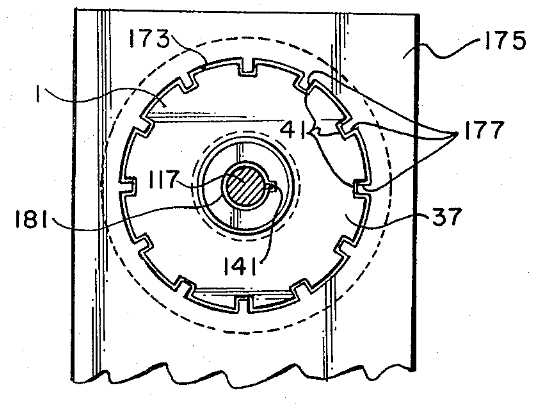
FIG. 14 is an elevation view as seen in the direction of the arrows from the line 14—14 in FIG. 13.

J. In FIG. 13, the receiver mechanism 81 is moved forward by the air cylinder 129 from the transfer position to a ready position in which the leading tip 117 of the support bar 83 is disposed within a central opening 173 in a stripper plate 175. The stripper plate 175, as shown in FIG. 14, has a circular array of radially oriented stripper fingers 177 which are aligned respectively with the plurality of circumferential perforations 41 in the film unit 37 of the film disk 1.

Figure 15:
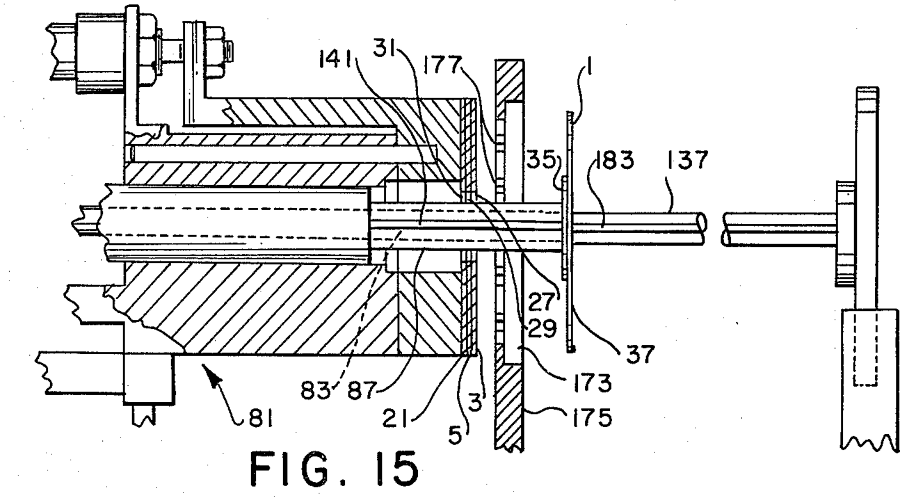

K. Then, the support bar 83 is moved forward by the air cylinder 93 until the leading tip 117 of the support bar is received in a center recess 181 in the photofinishing spindle 137. At the same time, in FIG. 15, the stripper tube 87 is moved forward by the air cylinder 103, through the central apertures 31, 29 and 27, respectively in the central portion 21, the cover member 5 and the separator layer 3 of the film cartridge. The stripper tube 87, in moving forward, pushes the film disk 1 through the central opening 173 in the stripper plate 175 and onto the photofinishing spindle 137. The stripper fingers 177 on the stripper plate 175 prevent the separator layer 3, and therefore the cover member 5 and the central portion 21, from moving through the opening 173 in the stripper plate. As the film disk 1 is pushed onto the photofinishing spindle 137 by the stripper tube 87, a key 183 on the photofinishing spindle, which is aligned with the key 141 on the support bar 83, is received in the keyway 39 of the disk core 35 to maintain correct orientation of the film disk during the subsequent photofinishing operations.

When the leading tip 117 of the support bar 83 is received in the center recess 181 in the photofinishing spindle 137, but before the stripper tube 87 can push the film disk 1 onto the photo-finishing spindle 1, valve means, not shown, is opened to release compressed air holding the piston 151 between the two ball detents 155 in FIG. 9. This allows the return spring 153 to remove the piston 151 from between the two ball detents 155. Whereupon, a pair of magnets, not shown, draw the two ball detents 155 through the respective openings 157 into the central chamber 152 in the support bar 83. Once inside the central chamber 152, the two ball detents 155 cannot prevent the film disk 1 from being pushed by the stripper tube 87 off the support bar 83.

L. The support bar 83 and the stripper tube 87 are simultaneously moved rearward from the photo-finishing spindle 137 respectively by the air cylinders 93 and 103. Then, the receiver mechanism 81 is moved rearward from the stripper plate 175 by the air cylinder 129.

Figure 16:
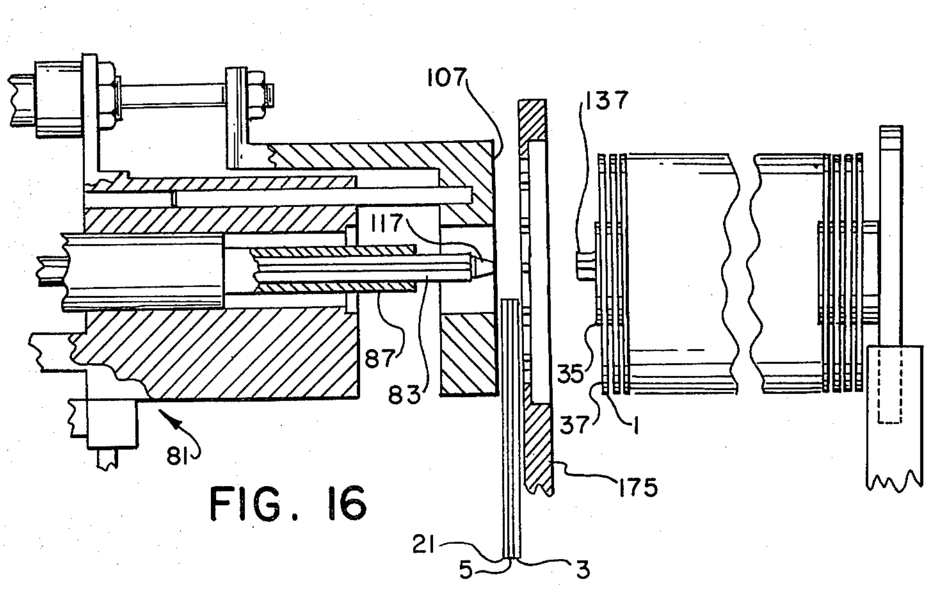

M. In FIG. 16, the face plate 107 is moved forward by the air cylinder 115 beyond the leading tip 117 of the support bar 83 to push the central portion 21, the cover member 5 and the separator layer 3 of the film cartridge off the support bar and into the scrap bin 163 in FIG. 2. FIG. 16 illustrates how a plurality of film disks 1 would be supported on the photofinishing spindle 137.

N. Then, the face plate 107 is moved rearward by the air cylinder 115, back along the support bar 83, and the receiver mechanism 81 is moved laterally by manual or other means to the starting position, shown in FIG. 3. Whereupon, the cartridge opening operation may be repeated.

Although appropriate control means for maintaining proper sequencing of the operational steps just described are not described, it will be appreciated that these means can be readily devised by one having ordinary skill in the art.

The present invention has been described in detail with particular reference to the preferred embodiment thereof, but it will be understood that variations and modifications can be effected within the spirit and scope of the invention.

What is claimed is:

1. A method of removing a film disk from a cartridge in which the film disk is located between a pair of wall members having (a) respective peripheral edge portions secured together and (b) respective central portions overlying the film disk, said method comprising the steps of:

separating the central and peripheral portions of each wall member, though maintaining the central portions overlying the film disk; and removing one of the central portions from the other to provide access to the film disk.

2. The method as recited in claim 1, wherein separation of the central and peripheral portions is effected substantially simultaneously for both of the wall members.

3. The method as recited in claim 1, wherein separation of the central and peripheral portions is caused by driving a punch against the wall members.

4. A method of removing a film disk from a cartridge in which the film disk is located between a pair of wall members having (a) respective peripheral edge portions secured together and (b) respective central portions overlying the film disk, said method comprising the steps of:

punching the wall members to sever respective annular configurations of the peripheral portions from the central portions, leaving each of the central portions with a diameter which is larger than that of the film disk;

moving one of the central portions away from the other; and restraining the other of the central portions along a region which extends beyond the film disk to enable removal of the film disk from the other central portion.

5. A method of removing a film disk from a cartridge in which the film disk is located between a pair of wall members having (a) respective peripheral edge portions secured together and (b) respective central portions overlying the film disk, said method comprising the steps of:

positioning the peripheral portions of the wall members on a die with the central portions located opposite an opening in the die;

driving a punch against the central portions to move them and the film disk through the die opening and separate each from the peripheral portions;

removing one of the central portions from the other to provide access to the film disk.

6. A method of removing a film disk from a cartridge in which the film disk is located between a pair of wall members having (a) respective peripheral edge portions secured together, (b) respective central portions overlying the film disk, and (c) respective apertures in the film disk and the central portions, said method comprising the steps of:

positioning the peripheral portions of the wall members on a die with the central portions located opposite an opening in the die;

inserting a support bar in the apertures in the film disk and the central portions;

driving a punch against the central portions to move them and the film disk through the die opening and separate each from the peripheral portions;

removing one of the central portions from the support bar;

restraining the other of the central portions on the support bar along a region which overlaps the film disk; and pushing the film disk off the support bar.

7. An apparatus for removing a film disk from a cartridge in which the film disk is located between a pair of wall members having (a) respective peripheral edge portions secured together and (b) respective central portions overlying the film disk, said apparatus comprising:

means for separating the central and peripheral portions of each wall member, though maintaining the central portions overlying the film disk; and means for removing one of the central portions from the other to provide access to the film disk.

8. The apparatus as recited in claim 7, wherein said separating means includes a punch and means for driving said punch against the wall members.

9. The apparatus as recited in claim 8, wherein said punch is shaped to sever respective annular configurations of the peripheral portions from the central portions to leave the central portions with similar diameters which are larger than that of the film disk.

10. An apparatus for removing a film disk from a cartridge in which the film disk is located between a pair of wall members having (a) respective peripheral edge portions secured together and (b) respective central portions overlying the film disk, said apparatus comprising:

a punch;

a die having an opening opposite which the central portions of the wall members may be located;

means for positioning the peripheral portions of the wall members on said die with the central portions located opposite said opening in said die;

means for driving said punching against the central portions to move them and the film disk through said die opening and separate each from the peripheral portions; and means for removing one of the central portions from the other to provide access to the film disk.

11. An apparatus for removing a film disk from a cartridge in which the film disk is located between a pair of wall members having (a) respective peripheral edge portions secured together, (b) respective central portions overlapping the film disk, and (c) respective apertures in the film disk and the central portions, said apparatus comprising:

a punch;

a die having an opening opposite which the central portions of the wall members may be located;

a support bar receivable in the apertures in the film disk and the central portions;

means for positioning the peripheral portions of the wall members on said die with the central portions located opposite said opening in said die;

means for inserting said support bar in the apertures in the film disk and the central portions;

means for driving said punch against the central portions to move them and the film disk through said die opening and separate each from the peripheral portions;

means for removing one of the central portions from said support bar;

means for restraining the other of the central portions on said support bar along a region of the other central portion which overlaps the film disk; and means for pushing the film disk off said support bar.

* * * * *